US008320707B2

(12) United States Patent
Gokturk et al.

(10) Patent No.: US 8,320,707 B2
(45) Date of Patent: Nov. 27, 2012

(54) SYSTEM AND METHOD FOR USE OF IMAGES WITH RECOGNITION ANALYSIS

(75) Inventors: Salih Burak Gokturk, Mountain View, CA (US); Munjal Shah, Los Altos, CA (US); Azhar Khan, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/088,277

(22) Filed: Apr. 15, 2011

(65) Prior Publication Data

US 2011/0194777 A1 Aug. 11, 2011

Related U.S. Application Data

(63) Continuation of application No. 12/431,706, filed on Apr. 28, 2009, now Pat. No. 7,945,099, which is a continuation of application No. 11/543,758, filed on Oct. 3, 2006, now Pat. No. 7,542,610, and a continuation-in-part of application No. 11/246,742, filed on Oct. 7, 2005, now Pat. No. 7,519,200.

(60) Provisional application No. 60/723,349, filed on Oct. 3, 2005, provisional application No. 60/723,356, filed on Oct. 3, 2005, provisional application No. 60/679,591, filed on May 9, 2005.

(51) Int. Cl.
*G06K 9/36* (2006.01)
(52) U.S. Cl. ........................................ 382/276; 382/224
(58) Field of Classification Search .................. 382/209, 382/224, 305, 276; 705/26
See application file for complete search history.

(56) References Cited

U.S. PATENT DOCUMENTS

| 5,296,945 | A | | 3/1994 | Nishikawa et al. |
| 5,450,504 | A | | 9/1995 | Calia |
| 5,734,749 | A | | 3/1998 | Yamada et al. |
| 5,781,650 | A | | 7/1998 | Lobo et al. |
| 5,845,639 | A | | 12/1998 | Hochman et al. |
| 5,901,246 | A | | 5/1999 | Hoffberg et al. |
| 5,982,912 | A | | 11/1999 | Fukui et al. |
| 6,035,055 | A | * | 3/2000 | Wang et al. ................... 382/118 |
| 6,173,068 | B1 | | 1/2001 | Prokoski |
| 6,353,823 | B1 | | 3/2002 | Kumar |
| 6,381,346 | B1 | | 4/2002 | Eraslan |

(Continued)

FOREIGN PATENT DOCUMENTS

JP 03188586 A 8/1991

(Continued)

OTHER PUBLICATIONS

Final Office Action dated Sep. 6, 2011 for U.S. Appl. No. 12/395,422, 11 pages.

(Continued)

*Primary Examiner* — John Strege
(74) *Attorney, Agent, or Firm* — Mahamedi Paradice Kreisman LLP; Van Mahamedi

(57) ABSTRACT

An index is provided that holds information about each image content item in a collection of items, For each image content item, a first information item identifying the image content item and its location on a network, and at least one of (i) a second information item identifying a signature value of an object in the image content, or (ii) identification of a recognized object in the image content.

21 Claims, 4 Drawing Sheets

U.S. PATENT DOCUMENTS

| | | |
|---|---|---|
| 6,397,219 B2 | 5/2002 | Mills |
| 6,418,430 B1 | 7/2002 | DeFazio et al. |
| 6,427,020 B1 | 7/2002 | Rhoads |
| 6,470,336 B1 | 10/2002 | Matsukawa et al. |
| 6,546,185 B1 | 4/2003 | Kim et al. |
| 6,549,913 B1 | 4/2003 | Murakawa |
| 6,556,196 B1 | 4/2003 | Blanz et al. |
| 6,556,713 B2 | 4/2003 | Kobayashi et al. |
| 6,564,225 B1* | 5/2003 | Brogliatti et al. ............. 1/1 |
| 6,606,417 B1 | 8/2003 | Brechner |
| 6,785,421 B1 | 8/2004 | Gindele et al. |
| 6,792,135 B1 | 9/2004 | Toyama |
| 6,801,641 B2 | 10/2004 | Eraslan |
| 6,819,783 B2 | 11/2004 | Goldberg et al. |
| 6,919,892 B1 | 7/2005 | Cheiky et al. |
| 6,925,197 B2 | 8/2005 | Dimitrova et al. |
| 6,928,231 B2 | 8/2005 | Tajima |
| 6,937,745 B2 | 8/2005 | Toyama |
| 6,999,614 B1 | 2/2006 | Bakker et al. |
| 7,006,236 B2 | 2/2006 | Tomasi et al. |
| 7,140,550 B2 | 11/2006 | Ramachandran |
| 7,203,356 B2 | 4/2007 | Gokturk et al. |
| 7,310,431 B2 | 12/2007 | Gokturk et al. |
| 7,340,077 B2 | 3/2008 | Gokturk et al. |
| 7,382,903 B2 | 6/2008 | Ray |
| 7,519,200 B2 | 4/2009 | Gokturk et al. |
| 7,542,610 B2* | 6/2009 | Gokturk et al. ............ 382/209 |
| 7,583,271 B2 | 9/2009 | Kawakami et al. |
| 7,643,671 B2 | 1/2010 | Dong et al. |
| 7,657,100 B2 | 2/2010 | Gokturk et al. |
| 7,657,126 B2 | 2/2010 | Gokturk et al. |
| 7,660,468 B2 | 2/2010 | Gokturk et al. |
| 7,681,140 B2 | 3/2010 | Ebert |
| 7,698,136 B1 | 4/2010 | Nguyen et al. |
| 7,711,155 B1 | 5/2010 | Sharma et al. |
| 7,761,713 B2* | 7/2010 | Baar ........................... 713/182 |
| 7,853,085 B2 | 12/2010 | Miller |
| 7,945,099 B2* | 5/2011 | Gokturk et al. ............ 382/209 |
| 7,996,218 B2 | 8/2011 | Kim et al. |
| 8,010,458 B2* | 8/2011 | Galbreath et al. ........... 705/319 |
| 2001/0033690 A1 | 10/2001 | Berche et al. |
| 2002/0097893 A1 | 7/2002 | Lee et al. |
| 2002/0103813 A1 | 8/2002 | Frigon |
| 2002/0107718 A1 | 8/2002 | Morrill et al. |
| 2002/0114522 A1 | 8/2002 | Seeber |
| 2002/0156686 A1 | 10/2002 | Kraft et al. |
| 2002/0187774 A1 | 12/2002 | Ritter et al. |
| 2003/0028451 A1 | 2/2003 | Ananian |
| 2003/0063778 A1 | 4/2003 | Rowe et al. |
| 2003/0063779 A1 | 4/2003 | Wrigley |
| 2003/0169906 A1 | 9/2003 | Gokturk et al. |
| 2003/0195901 A1 | 10/2003 | Shin et al. |
| 2003/0202683 A1 | 10/2003 | Ma et al. |
| 2004/0003001 A1 | 1/2004 | Shimura |
| 2004/0102971 A1 | 5/2004 | Lipscher et al. |
| 2004/0215657 A1 | 10/2004 | Drucker et al. |
| 2004/0264810 A1 | 12/2004 | Taugher et al. |
| 2005/0002568 A1 | 1/2005 | Chupeau et al. |
| 2005/0033641 A1 | 2/2005 | Jha et al. |
| 2005/0078885 A1 | 4/2005 | Ozaki et al. |
| 2005/0094897 A1 | 5/2005 | Zuniga |
| 2005/0102201 A1 | 5/2005 | Linker et al. |
| 2005/0111737 A1 | 5/2005 | Das et al. |
| 2005/0271304 A1 | 12/2005 | Retterath et al. |
| 2006/0053342 A1 | 3/2006 | Bazakos et al. |
| 2006/0097988 A1 | 5/2006 | Hong |
| 2006/0133699 A1 | 6/2006 | Widrow et al. |
| 2006/0136982 A1 | 6/2006 | Martinolich |
| 2006/0143176 A1 | 6/2006 | Mojsilovic et al. |
| 2006/0173560 A1 | 8/2006 | Widrow et al. |
| 2006/0227992 A1 | 10/2006 | Rathus et al. |
| 2006/0251292 A1 | 11/2006 | Gokturk et al. |
| 2006/0251338 A1 | 11/2006 | Gokturk et al. |
| 2006/0253491 A1 | 11/2006 | Gokturk et al. |
| 2007/0003113 A1 | 1/2007 | Goldberg |
| 2007/0078846 A1 | 4/2007 | Gulli et al. |
| 2007/0081744 A1 | 4/2007 | Gokturk et al. |
| 2007/0098303 A1 | 5/2007 | Gallagher et al. |
| 2007/0258645 A1 | 11/2007 | Gokturk et al. |
| 2008/0080745 A1 | 4/2008 | Gokturk et al. |
| 2008/0082426 A1 | 4/2008 | Gokturk et al. |
| 2008/0091572 A1 | 4/2008 | Kraft et al. |
| 2008/0109841 A1 | 5/2008 | Heather et al. |
| 2008/0144943 A1 | 6/2008 | Gokturk et al. |
| 2008/0152231 A1 | 6/2008 | Gokturk et al. |
| 2008/0154625 A1 | 6/2008 | Serbanescu |
| 2008/0162269 A1 | 7/2008 | Gilbert |
| 2008/0162574 A1 | 7/2008 | Gilbert |
| 2008/0177640 A1 | 7/2008 | Gokturk et al. |
| 2008/0199075 A1 | 8/2008 | Gokturk et al. |
| 2008/0212849 A1 | 9/2008 | Gao |
| 2008/0212899 A1 | 9/2008 | Gokturk et al. |
| 2009/0019008 A1 | 1/2009 | Moore et al. |
| 2009/0034782 A1 | 2/2009 | Gering |
| 2009/0177628 A1 | 7/2009 | Yanagisawa et al. |
| 2009/0196510 A1 | 8/2009 | Gokturk et al. |
| 2009/0208116 A1 | 8/2009 | Gokturk et al. |
| 2009/0248599 A1 | 10/2009 | Hueter et al. |
| 2010/0082604 A1 | 4/2010 | Gutt et al. |
| 2010/0135582 A1 | 6/2010 | Gokturk et al. |
| 2010/0135597 A1 | 6/2010 | Gokturk et al. |

FOREIGN PATENT DOCUMENTS

| | | |
|---|---|---|
| JP | 2002-328925 | 11/2002 |
| JP | 2003-216866 A | 7/2003 |
| JP | 2004-220074 A | 8/2004 |
| JP | 2006-119836 | 11/2006 |
| KR | 1020070077908 A | 7/2007 |

OTHER PUBLICATIONS

Non-Final Office Action dated Oct. 12, 2011 for U.S. Appl. No. 12/648,245, 17 pages.

Non-Final Office Action dated Oct. 12, 2011 for U.S. Appl. No. 12/819,901, 17 pages.

Non-Final Office Action dated Aug. 17, 2011 for U.S. Appl. No. 11/936,694, 8 pages.

Non-Final Office Action dated Mar. 25, 2011 for U.S. Appl. No. 11/777,894, 24 pages.

Non-Final Office Action dated Feb. 7, 2011 for U.S. Appl. No. 11/685,106, 12 pages.

Non-Final Office Action dated Feb. 7, 2011 for U.S. Appl. No. 12/395,422, 10 pages.

Supplemental International Search Report for EP Application No. 07868686.2, 8 pages.

Final Office Action dated Oct. 20, 2008 for U.S. Appl. No. 11/543,758, 7 Pages.

Final Office Action dated Aug. 11, 2008 for U.S. Appl. No. 11/246,741, 18 Pages.

Final Office Action dated Jun. 30, 2009 for U.S. Appl. No. 11/246,589, 13 Pages.

Final Office Action dated Jul. 7, 2009 for U.S. Appl. No. 11/777,070, 10 Pages.

Final Office Action dated Jun. 16, 2009 for U.S. Appl. No. 11/936,705, 20 Pages.

International Preliminary Report on Patentability and Written Opinion of the International Searching Authority in Application PCT/US2006/018016, Oct. 16, 2008, 12 pages.

International Preliminary Report on Patentability in Application PCT/US2006/038864, Dec. 11, 2008, 10 pages.

International Preliminary Report on Patentability and Written Opinion of the International Searching Authority in Application PCT/US2007/083935, May 22, 2009, 20 pages.

International Search Report and Written Opinion of the International Searching Authority in Application PCT/US06/18016, U.S.International Searching Authority, Jun. 17, 2008, 17 pages.

International Search Report and Written Opinion of the International Searching Authority in Application PCT/US06/38864, U.S.International Searching Authority, Oct. 14, 2008, 16 pages.

International Search Report and Written Opinion of the International Searching Authority in Application PCT/US07/83935, U.S.International Searching Authority, Aug. 18, 2008, 23 pages.

Non-Final Office Action dated Oct. 16, 2008 for U.S. Appl. No. 11/777,070, 10 Pages.
Non-Final Office Action dated Oct. 21, 2008 for U.S. Appl. No. 11/936,705, 18 Pages.
Non-Final Office Action dated Oct. 27, 2008 for U.S. Appl. No. 11/246,434, 11 Pages.
Non-Final Office Action dated May 28, 2009 for U.S. Appl. No. 11/246,434, 6 Pages.
Non-Final Office Action dated Oct. 27, 2008 for U.S. Appl. No. 11/936,734, 7 Pages.
Non-Final Office Action dated Dec. 29, 2008 for U.S. Appl. No. 11/246,589, 19 Pages.
Non-Final Office Action dated Dec. 30, 2008 for U.S. Appl. No. 11/936,713, 15 Pages.
Non-Final Office Action dated Apr. 7, 2009 for U.S. Appl. No. 11/246,741, 21 Pages.
Non-Final Office Action dated Dec. 6, 2007 for U.S. Appl. No. 11/246,741, 31 Pages.
Non-Final Office Action dated Jun. 3, 2008 for U.S. Appl. No. 11/246,742, 16 Pages.
Non-Final Office Action dated Jun. 6, 2008 for U.S. Appl. No. 11/543,758, 13 Pages.
Non-Final Office Action dated Aug. 6, 2009 for U.S. Appl. No. 11/936,734, 6 Pages.
Notice of Allowance dated Dec. 22, 2008 for U.S. Appl. No. 11/246,742, 12 Pages.
Notice of Allowance dated Apr. 17, 2009 for U.S. Appl. No. 11/543,758, 14 Pages.
Tu, Zhuowen et al., "Image Parsing: Unifying Segmentation, Detection, and Recognition," Proceedings of the Ninth IEEE International Conference on Computer Vision (ICCV 2003), University of California, Los Angeles, Los Angeles, CA 90095, 7 pages.
Yuille, A.L. et al, "Signfinder: Using Color to detect, localize and identify informational signs," Proceedings International Conference on Computer Vision, ICCV, 1998, Smith-Kettlewell Eye Research Institute, 2318 Fillmore Street, San San Francisco, CA 94115, 9 pages.
Notice of Allowance dated Oct. 1, 2009 for U.S. Appl. No. 11/936,734, 12 Pages.
Notice of Allowance dated Sep. 28, 2009 for U.S. Appl. No. 11/936,713, 15 Pages.
Final Office Action dated Oct. 27, 2009 for U.S. Appl. No. 11/246,741, 20 Pages.
Non-Final Office Action dated Sep. 14, 2009 for U.S. Appl. No. 11/246,434.11 pages.
Non-Final Office Action dated Sep. 30, 2009 for U.S. Appl. No. 12/431,706. 9 pages.
Notice of Allowance dated Sep. 17, 2009 for U.S. Appl. No. 11/936,705 14 Pages.
Non-Final Office Action dated Dec. 2, 2009 for U.S. Appl. No. 11/246,589. 14pages.
Non-Final Office Action dated Dec. 15, 2009 for U.S. Appl. No. 12/395,422. 10pages.
Notice of Allowance dated Feb. 22, 2010 for U.S. Appl. No. 11/246,343. 6pages.
Liu, James et al., "Smart Shopper: An Agent-Based Web-Mining Approach to Internet Shopping," IEEE Transactions on Fuzzy Systems, vol. 11, No. 2, Apr. 2003,12 pages.
Gangopadhyay, Aryya, "An image-based system for electronic retailing", Decision Support Systems 32, 2001, Department of Information Systems, University of Mayland Baltimore County, 1000 Hilltop Circle, ACIV 481, Baltimore, MD 21250, 10 pages.
Lii, Yi et al., "Object Recognition for Content-Based Image Retrieval", Department of Computer Science and Engineering, University of Washington, Seattle, WA 98195-2350, Jan. 2002, 21 pages.
Wang, James et al., "SIMPLIcity: Semantics-Sensitive Integrated Matching for Picture Libraries" IEEE Transactions on Pattern Analysis and Machine Intelligence, vol. 23, No. 9, Sep. 2001, 17 pages.

Notice of Allowance dated Mar. 1, 2010 for U.S. Appl. No. 11/777,070 11 pages.
International Search Report and Written Opinion mailed Feb. 24, 2010 in PCT/US2009/050600 13 pgs.
Order Granting/Denying Request for Inter Parts Reexamination mailed Apr. 26, 2010 for U.S. Appl. No. 95/001,307; 15 pages.
Action Closing Prosecution mailed Apr. 26, 2010 for U.S. Appl. No. 95/001,307; 20 pages.
Final Office Action mailed May 12, 2010 for U.S. Appl. No. 12/431,706; 12 pages.
Replacement Request for Ex Parte Reexamination dated Mar. 18, 2010 for U.S. Appl. No. 95/001,307, 145 pages.
Notice of Allowance dated Jun. 2, 2010 for U.S. Appl. No. 11/777,070 16 pages.
Final Office Action dated Jun. 2, 2010 for U.S. Appl. No. 12/395,422. 21 pages.
Notice of Allowance dated Jun. 9, 2010 for U.S. Appl. No. 11/246,434 11 pages.
Notice of Allowance dated Aug. 17, 2010 for U.S. Appl. No. 11/246,741, 23 pages.
Notice of Allowance dated Aug. 11, 2010 for U.S. Appl. No. 11/246,589, 10 pages.
Non-Final Office Action dated Oct. 7, 2010 for U.S. Appl. No. 11/841,355, 15 pages.
Weinberger et al., "Nonlinear Dimensionality Reduction by Semidefinite Programming and Kernel Matrix Factorization", Proceedings of the 10th International Workshop on Artificial Intelligence and Statistics, 2005, pp. 381-388.
Roweis et al., "Nonlinear Dimensionality Reduction by Locally Linear Embedding", Science, vol. 290, Dec. 22, 2000, pp. 2323-2326.
Weinberger et al., Distance Metric Learning for Large Margin Nearest Neighbor Classification, Advances in Neural Information Processing Systems, vol. 18, 2006, pp. 1473-1480.
International Search Report, Written Opinion and Notice of Transmittal of same mailed Aug. 17, 2010 in PCT/US10/037139 10 pages.
Notice of Allowance dated Oct. 29, 2010 for U.S. Appl. No. 12/431,706; 9 pages.
Arnold W.M. Smeulders, et al., "Content-Based Image Retrieval at the End of the Early Years", IEEE Transactions on Pattern Analysis and Machine Intelligence, vol. 22, No. 12. Dec. 2000, 32 pages.
Charels Frankel, et al., "WebSeer: An Image Search Engine for the World Wide Web", The University of Chicago, Computer Science Department, 110 East 58th Street, Chicago, Illinois 60637, Technical Report 96-14, Aug. 1, 1996, 24 pages.
Philippe Aigrain, et al., "Content-Based Representation and Retrieval of Visual Media: A State-of-the-Art Review", Multimedia Tools and Applications 3, 179-202, 1996, 24 pages.
Notice of Allowance dated Jan. 5, 2011 for U.S. Appl. No. 12/431,706; 9 pages.
Supplemental European Search Report dated Dec. 16, 2011 for EP Application No. 09798677.2, 8 pages.
Non-Final Office Action mailed Jan. 17, 2012, for U.S. Appl. No. 12/182,122, filed Jul. 29, 2008.
Final Office Action dated Feb. 23, 2012, issued in U.S. Appl. No. 12/503,034, filed Jul. 14, 2009.
Non-Final Office Action dated Oct. 21, 2011 for U.S. Appl. No. 12/962,494, 11 pages.
Notice of Allowance dated Nov. 10, 2011 for U.S. Appl. No. 12/819,970, 22 pages.
Non-Final Office Action dated Nov. 22, 2011 for U.S. Appl. No. 12/961,790, 34 pages.
Final Office Action dated Dec. 6, 2011 for U.S. Appl. No. 11/777,894, 29 pages.
Non-Final Office Action dated Jan. 4, 2012 for U.S. Appl. No. 12/648,287, 17 pages.

* cited by examiner

US 8,320,707 B2

SYSTEM AND METHOD FOR USE OF IMAGES WITH RECOGNITION ANALYSIS

PRIORITY CLAIM/RELATED APPLICATIONS

This application is a continuation of U.S. patent application Ser. No. 12/431,706, entitled SYSTEM AND METHOD FOR USE OF IMAGES WITH RECOGNITION ANALYSIS, filed on Apr. 28, 2009, now U.S. Pat. No. 7,945,099 which is a continuation of U.S. patent application Ser. No. 11/543,758, entitled SYSTEM AND METHOD FOR USE OF IMAGES WITH RECOGNITION ANALYSIS, filed on Oct. 3, 2006, now U.S. Pat. No. 7,542,610 which (i) claims priority to: U.S. Provisional Patent Application No. 60/723,349, entitled REALITY BASED PHOTO ADVERTISING, filed Oct. 3, 2005; (ii) claims priority to: U.S. Provisional Patent Application No. 60/723,356, entitled PRIVACY CONCERNED PHOTO SHARING/GRADUAL PHOTO DISCOVERY, filed Oct. 3, 2005; (iii) and is a continuation-in-part of U.S. patent application Ser. No. 11/246,742, entitled SYSTEM AND METHOD FOR ENABLING THE USE OF CAPTURED IMAGES THROUGH RECOGNITION, filed on Oct. 7, 2005, now U.S. Pat. No. 7,519,200 which claims priority to U.S. Provisional Patent Application No. 60/679,591, entitled METHOD FOR TAGGING IMAGES, filed May 9, 2005. All of the aforementioned priority applications are hereby incorporated by reference in their entirety.

TECHNICAL FIELD

The disclosed embodiments relate generally to the field of digital image processing. More particularly, the disclosed embodiments relate to a system and method for enabling the use of captured images.

BACKGROUND

Digital photography has become a consumer application of great significance. It has afforded individuals convenience in capturing and sharing digital images. Devices that capture digital images have become low-cost, and the ability to send pictures from one location to the other has been one of the driving forces in the drive for more network bandwidth.

Due to the relative low cost of memory and the availability of devices and platforms from which digital images can be viewed, the average consumer maintains most digital images on computer-readable mediums, such as hard drives, CD-Roms, and flash memory. The use of file folders are the primary source of organization, although applications have been created to aid users in organizing and viewing digital images. Some search engines, such as GOOGLE, also enables users to search for images, primarily by matching text-based search input to text metadata or content associated with images.

DETAILED DESCRIPTION

Figure 1:
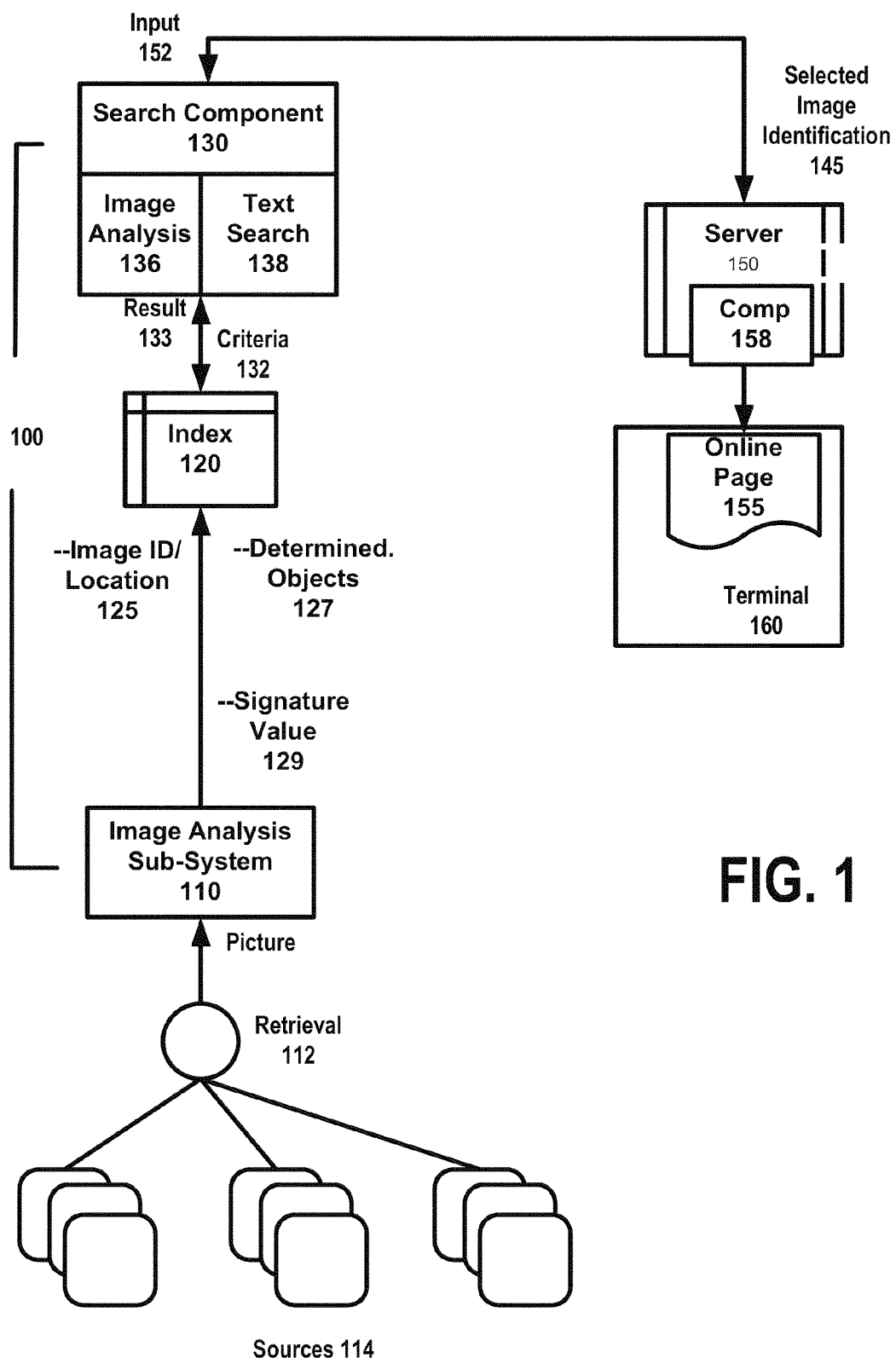
FIG. 1 illustrates a system for selecting images for presentation on an online document in connection with existing content, under an embodiment of the invention.

Embodiments provide for a programmatic selection of image content for a document that is viewed by a person. One or more embodiments provide for an online environment, where the user views a document, and image content corresponding to pictures, advertisements, or other image content is displayed to the user to correspond to content from the document that the user views or interacts with. In one embodiment, an image analysis is performed on a collection of image content items to obtain information about each of the items. The analysis results in one or more of (i) determination of one or more objects in individual image content items, or (ii) determination of a signature value for each determined object. The information obtained from the image analysis in a data structure, such as an index. The data structure is made available for search operations that specify one or more criteria determined from a text or image content provided in connection with the document that is viewed by the user.

In another embodiment, an index is provided that holds information about each image content item in a collection of items, For each image content item, a first information item identifying the image content item and its location on a network, and at least one of (i) a second information item identifying a signature value of an object in the image content, or (ii) identification of a recognized object in the image content.

In another embodiment, a computer system is provided for selecting image content item for a document. The system includes a search component that communicates with one or more servers. Each of the one or more servers serve one or more web pages to terminals. The search component is configured to be responsive to an input identified from a user of one of the terminals interacting with a particular web page to generate a criteria for selecting image content item for a document. In response to the input containing an image, the search component analyzes the image to determine one or more objects in the image of the input, and uses the one or more objects determined from the analysis as a basis of the criteria for selecting the image content.

As used herein, the term "image data" is intended to mean data that corresponds to or is based on discrete portions of a captured image. For example, with digital images, such as those provided in a JPEG format, the image data may correspond to data or information about pixels that form the image, or data or information determined from pixels of the image.

The term signature value means one or more quantitative values that distinguish or like an appearance of an object from another object. The values may correspond to vectors or multi-dimensional values. In addition, a signature value may be one value, or a collection or aggregate of several other values (e.g. multiple feature vectors). Feature, or feature extraction are other terms that are generally used elsewhere and have the same meaning that we emphasize with the term signature.

The terms "recognize", or "recognition", or variants thereof, in the context of an image or image data (e.g. "recognize an image") is meant to means that a determination is made as to what the image correlates to, represents, identifies, means, and/or a context provided by the image. Recognition does not mean a determination of identity by name, unless stated so expressly, as name identification may require an additional step of correlation.

As used herein, the terms "programmatic", "programmatically" or variations thereof mean through execution of code, programming or other logic. A programmatic action may be performed with software, firmware or hardware, and generally without user-intervention, albeit not necessarily automatically, as the action may be manually triggered.

One or more embodiments described herein may be implemented using programmatic elements, often referred to as modules or components, although other names may be used. Such programmatic elements may include a program, a subroutine, a portion of a program, or a software component or a hardware component capable of performing one or more stated tasks or functions. As used herein, a module or component, can exist on a hardware component independently of other modules/components or a module/component can be a shared element or process of other modules/components, programs or machines. A module or component may reside on one machine, such as on a client or on a server, or a module/component may be distributed amongst multiple machines, such as on multiple clients or server machines. Any system described may be implemented in whole or in part on a server, or as part of a network service. Alternatively, a system such as described herein may be implemented on a local computer or terminal, in whole or in part. In either case, implementation of system provided for in this application may require use of memory, processors and network resources (including data ports, and signal lines (optical, electrical etc.), unless stated otherwise.

Embodiments described herein generally require the use of computers, including processing and memory resources. For example, systems described herein may be implemented on a server or network service. Such servers may connect and be used by users over networks such as the Internet, or by a combination of networks, such as cellular networks and the Internet. Alternatively, one or more embodiments described herein may be implemented locally, in whole or in part, on computing machines such as desktops, cellular phones, personal digital assistances or laptop computers. Thus, memory, processing and network resources may all be used in connection with the establishment, use or performance of any embodiment described herein (including with the performance of any method or with the implementation of any system).

Furthermore, one or more embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums.

Overview

FIG. 1 illustrates a system for selecting images for presentation on an online document in connection with existing content, under an embodiment of the invention. Under one implementation, an image selection system 100 such as shown by FIG. 1 may be used to select image content for concurrent presentation with content that is existing on a web page. Alternatively, the image selection system 100 such as described may be used to replace, append or provide new image content based on a content that that the user views or interacts with. As used throughout any of the embodiments described herein, the image content that can be selected and rendered to the user may include any content with images, such as simple pictures (such as provided as JPEG or GIF) or documents or files that contain images as a portion (e.g. advertisement media with text and image).

According to an embodiment, the image selection system 100 of FIG. 1 includes a image analysis sub-system 110, an index 120, and a search component 130. In one embodiment, the image selection system 100 may be made available as a service to operators of web sites and domains. To this end, the image selection system 100 may be made available to one or more servers 150, each of which interact with terminals 160 operated by users. The servers 150 provide content in the form of web pages 155 or other online documents or resources. For simplicity, FIG. 1 illustrates one server 150 and one terminal 160, which may be considered representative of numerous servers or terminals. The image selection system 100 may identify image content that is selected responsively, or on-the-fly, in response to activities of the server 150 or the user in connection with the downloaded page 155. Under one or more embodiments, such selection may be based on existing content that is either downloaded to the user, detected as being viewed by the user, or otherwise selected or subject to interaction by the user.

One or more aggregation processes 112 or mechanisms may be used to procure image content in anyone of various forms. The processes 112 may locate image content items, such as digital images from numerous libraries, data bases, media collections, or sources for such media that are accessible over the Internet. Embodiments contemplate the use of licensed libraries of pictures, and repositories of pictures donated by the public. In addition, one or more embodiments contemplate use of images that, when selected for display by image selection system 100, result in some monetary benefit to a proprietor of that system are of the server 150 that rendered image. In the latter case, the images may correspond to, for example, advertisements, or images available through an online service. Such images may be programmatically retrieved, a provided to a proprietor of system 100 as a library. Numerous other sources of images are contemplated. For example, a web crawler may be used to crawl domains on the Internet and to identify images by file type (e.g. JPEG). The aggregation processes 112 may store and make pictures available individually for the image analysis sub-system 110. Thus, while specific embodiments described herein may reference use of images that can be identified or retrieved through use of the index 120, embodiments provide that the index 120 may associate or reference content that incorporates such images. Examples of such content include advertisement media (images, text with slogan) or multimedia content.

The image analysis sub-system 110 analyzes individual images as they are located from the aggregation processes 112 or otherwise provided to the system 100. According to an embodiment, the image analysis sub-system 110 performs various kinds of analysis on individual images to identify information about the contents of the images. In one implementation, the image analysis sub-system 110 outputs the information it determines from individual images to the index 120. For each image, the index 120 may store (i) an identifier 125 to the image and/or to the location of the image, (ii) information identified from data associated with the image, and (iii) information identified from performing recognition analysis on the image. Various other kinds of information may be stored. In one embodiment, information stored with each image includes object identification information 127 and a signature value 129 for identified objects. As will be described, the object identification information 127 identifies objects in a picture, with a level of specificity or characteristic information that may vary amongst implementations. The object identification information 127 may be derived from image analysis or text extraction (also described below). The signature value 129, on the other hand, may be a quantitative expression of an object in the image. The signature value 129 may be the result of image analysis processes.

As mentioned, one of the analysis performed by the image analysis sub-system 110 includes extracting text or other information (e.g. metadata) provided with the image to determine information about objects or content in the image. Image recognition processes may also be performed to recognize or detect objects from the image. In performing recognition to identify one or more objects in an image, the image analysis sub-system 110 may also identify one or more characteristics of the object, such as coloring or salient features. Recognized objects and features of an image include persons, items that appear in the image (e.g. shoes) or even text that appears in the image (such as on a sign). Thus, object identification information 127 may include more than mere identification of the object. The object identification information may also include descriptive information about the object. In one implementation, the object identification information 127 is provided as text data to the index 120.

In addition to object identification information 127, the image recognition process may be performed to determine the signature value 129 of objects detected from individual images. In contrast to object identification information 127, the signature value 129 may, under one implementation, be a numeric or quantitative description of an object. The signature value 129 can identify one object from another object of the same kind. To this extent, the signature value 129 may be used to determine when two objects are the same (e.g. same person's face, same model and type of shoes), or when two objects are similar (e.g. two people look alike, or two shoes have similar appearance). The latter case is referred to as a "similarity comparison".

Numerous techniques exist to determine objects in images, as well as to detect characteristics of determined objects, and obtaining signature values of objects in images. Some of these techniques are described in, for example, U.S. patent application Ser. No. 11/246,742, entitled SYSTEM AND METHOD FOR ENABLING THE USE OF CAPTURED IMAGES THROUGH RECOGNITION, filed on Oct. 7, 2005; which is hereby incorporated by reference in its entirety. Any of the priority documents may be used in their teachings for determining objects (including persons, apparel etc.) and obtaining signature values for such objects. In addition, sections provided below provide additional information about identifying objects from images for specific kinds or categories of objects, and formulating signature values by way of feature vectors.

The following examples are illustrative of the possible information that can be outputted by the image analysis sub-system 110 when performing recognition on individual images (or content containing images). In the case where an object or feature that is recognized from an image corresponds to a face, the recognition may also include, as part of the object identification information 127, one or more of the following: the coloring of the person's hair or skin, the gender of the person, the person's eye color, the race of the individual, and the age group of the individual. In the case where an object or feature that is recognized from an image corresponds to a shoe, the recognition may also include, as part of the object identification information 129, one or more of the following: the color of shoe; whether the shoe is for a man, woman or child; the shoe style; the color of the shoe; the shape of the shoe at various places, such as the heal or tip; and other salient information such as whether the shoe contains a buckle or zipper, or the pattern of the shoe. As mentioned, under one implementation, of the object identification information 127 may be in the form of text data. For each recognized object in the examples provided, the signature value 129 provides a quantitative characterization of the characteristics of that object, to distinguish that object from other objects, or like the object to other object. With the face of a person, this may account for specific features in the person's face. With objects, such as shoes, the signature value may quantitatively reflect the shape, color, pattern and salient features of the shoe.

According to an embodiment, the image analysis sub-system 110 is a programmatic component that performs its functions through execution of code or logic (i.e. programmatically). One or more alternative embodiments contemplate the image analysis sub-system 110 as including manual operators in addition to programmatic processes. In one implementation, object detection is performed by manual operators who view images individually and categorize or provide information about the contents of the images. In such an embodiment, the image analysis sub-system 110 may provide a human interface to display images from a collection, and accept and record input from operators viewing the image. Still further, one or more alternative embodiments provide for a combination of manual intervention and programmatic processes to analyze the contents of the images. In one embodiment, the result of programmatic object detection is displayed to a human operator along with the image, and the human operator may verify or correct the recognition. The human operator may also supplement or append the recognition, by, for example, detecting a salient feature that is missed by the programmatic element. In such an embodiment, one implementation provides for a human operator interface that displays numerous (i.e. tens or hundreds) of images at once, along with the object identification information 127, and requires the human operator to verify or correct pictures individually, but as a cluster.

From the output of the image analysis sub-system 110, the index 120 may store entries that identify or locate individual images, as well as text or quantitative information derived from the image recognition processes. The index 120 may be made available to a search component 130, which identifies criteria and uses the information stored in index 120 to select images. The search component is responsive to an input 152 that is provided from server 150.

Embodiments described herein provided for various kinds of input 152. Input 152 may correspond to one or more of the following: (i) a selection of content that a user on the terminal 160 makes through some affirmative action, such as selecting and clicking with the mouse or other pointer device; (ii) a detection of content that a user is viewing or is interested in, such as by way of identifying content on a portion of the downloaded web page that the user is viewing; (iii) identification of any content up hearing on the web page; (iv) identification of a subject of a content that the user is viewing.

In order to provide the input 152, server 150 may be configured to include a programmatic component that can identify and communicate the input 152 to the image selection system 100. In the case where input 152 corresponds to a selection of content by the user, the user may select an image, link or other data element that is associated with a subject or topic. The component 158 may communicate the selected topic or link to the system 100. For example, if the user selects an image or a link to a movie star, the component 158 may communicate the name of the movie star to the system 100. Alternatively, the component 158 may identify an associated topic of the selected item. For example, if the user selects to view a particular kind of sports car, the component 158 may include intelligence to identify either the make of the sports car, or just "expensive car", or another topic that the component 158 is programmed to associate with the selected topic (e.g. a demographic may be identified by the selection).

In the case where the content on the page 155 is detected, the programmatic component 158 may perform similar process to identify, for example, metadata associated with an image, embedded links in the page, or information pertaining to advertisements that appear on the page. One embodiment provides that for text content, programmatic component 158 performs a key word search to identify the contents of the document by keyword. From any of these processes, the programmatic component 158 may identify a subject, that is then communicated as part of input 152 to the system 100. As will be described, what is returned is content, including images, that relate to the input 152.

In addition to implementations and examples provided above, numerous alternatives are also possible. In one embodiment, for example, text input manually entered by the user forms the basis for determining the subject for input 152. For example, a search term that the user enters for a search engine may be used for input 152, or results from the search. Alternatively, text the user enters through use of the web page 155 can be inspected for keywords, and then communicated as input 152 to system 100. For example, the user may enter an email content that is then inspected for key words, or for its subject line. In either case, identification of the text results in the display of images from system 100 that are deemed pertinent in some way to the content that is or was existing on the web page 155.

From the input, the search component 130 performs a search using the index 120. The search component may form a criteria 132 from the input 152. One or more embodiments provide that the search component 130 can receive as input either images or text based data. Accordingly, search component 130 may include an image analysis component 136 to analyze image data as input 152, and text component 138 to analyze text based input 152. In one embodiment, the image analysis component 136 forms either a signature criteria or a text criteria. The type of criteria 132 and how its implemented to select images depends on implementation, as illustrated by the following usage scenarios. In the case where input 152 corresponds to an image, one embodiment provides that the image analysis component 136 recognizes or determines an object in the image, and then uses that determination in forming the search criteria 132 on the index 120. As an alternative or addition, the image analysis component 136 determines the signature value of the object in the image, and uses that value as the criteria (or portion thereof). The signature value may be used when either an exact match to the object in the image input is needed, or when a similarity or likeness match is desired to that object.

For example, the image input may be identified by user input (i.e. the user selects an image), or provided on a page or portion thereof that the user views. From the image input, the image analysis component 136 of the search component 130 determines one or more objects in the image. The image analysis component 136 then forms criteria based on the determined objects. In one implementation, this criteria may be text based.

As an alternative or addition, the image analysis component 136 determines a signature from the image input. The criteria is then based on the signature and compared against other image signatures in the index 120. In one embodiment, a similarity or likeness match may be performed to identify objects that are similar, or which have similar features. For example, the user may view a merchandise (e.g. rug) for sale, select the image, and direct the image to be compared against other similar images. The signature of the rug may then be used to form a criteria to perform a similarity match for other rugs, or for other merchandise carrying a pattern similar to the desired rug. Alternatively, the user may submit image to identify an identical product or design, so that he can compare pricing.

In the case where input 152 corresponds to a text item, the criteria may be based more directly on the input 152. The text component 138 of the search component 130 may translate, parse or otherwise process the input to form the criteria. Still further, the criteria may be based on both image and text, and carry a combination of any of the image analysis or text component described above.

In either of the cases described, one or more embodiments provide that the criteria 132 returns either (i) a set of one or more images, or (ii) identification of the images or their locations. The search component may process a result 133 corresponding to the results from the index 120. The system 100 may return a set of identification 145 to the selected images, or alternatively, the selected images themselves (with or without other content). The images are then provided in the web page 152. Various examples of how images may be provided to supplement content, provide advertisement media, or provide merchandise objects.

Alternatively, the system 100 may be provided separate or independent from the server 150. For example, a user may simply copy content from the web page and visit a domain or site where the system 100 is provided. In such a case, the input 152 may be provided directly from the user, and the output of the identified images may form a new page.

In another embodiment, the index 120 may specify image content that has not had image data analysis. For example, index 120 may include advertisement media. Information associated with each advertisement media may be determined from text associated with the media, or may be manually determined.

Embodiments described with FIG. 1 may be performed through use of one or more processors and storage components that are in communication with each other. In one embodiment, components that form the image selection system 100 may be distributed at different locations on a network, and even handled by different operators or domains. For example, while embodiments contemplate that the index 120 is operated in connection with the image analysis subsystem 110, one or more alternative embodiments contemplate that the index 120 and the image sub-system 110 are operated independently, at different network locations or sites.

With regard to any of components or elements of a system such as described, one or more embodiments contemplate use of servers, computers, or processing combinations that perform functions such as described with the search component 130 or the image recognition sub-system 110. Furthermore, the index 120 and other components may incorporate storage mediums structured in the form of databases or other memory resources. A system such as described by FIG. 1 may be distributed over multiple locations on a network such as the Internet, or provided on one domain or even on one server. For example, the index 120 and the search component 130 may be provided at different locations, and operated independently of one another by different operators.

Methodology

Figure 2:
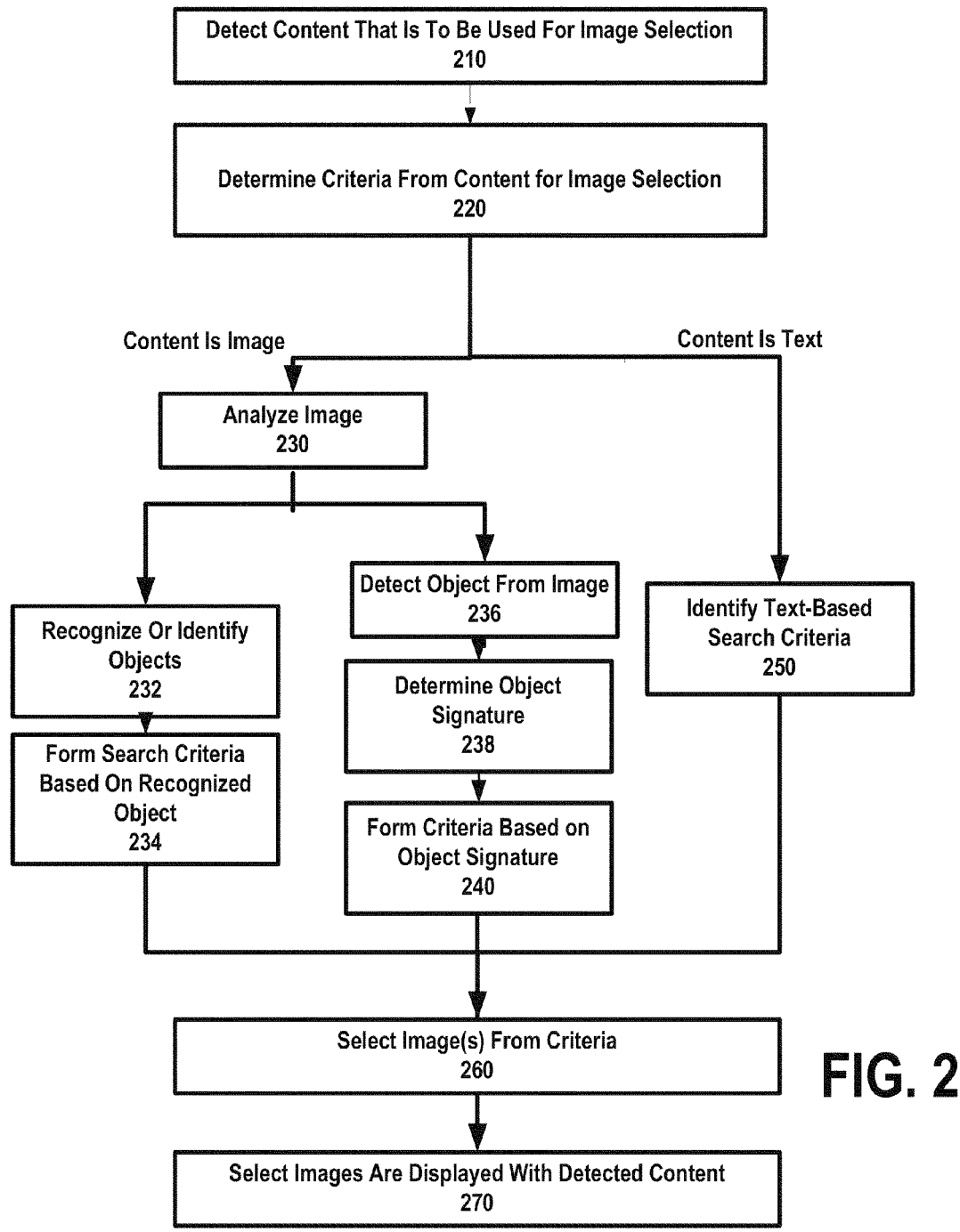
FIG. 2 illustrates a method to use an index that stores information about images, under an embodiment of the invention.

FIG. 2 illustrates a method to use an index that stores information about images, under an embodiment of the invention. A method such as described by FIG. 2 may be performed using a system such as illustrated by FIG. 1. As such, reference to elements of FIG. 1 is intended to illustrate suitable components for performing one or more steps or sub-steps being described.

In a step 210, content that is to be used for image selection is detected. As mentioned, one embodiment provides that the content is identified from a third-party server or domain that serves a web page to a terminal. Other embodiments provide that the content is specified by the user, interacting directly with the image selection system 100.

Step 220 provides that a criteria is determined from the content. Different sub-processes are possible in this step. In one embodiment, the content from step 210 is an image. In the case where the content is an image, two different processes may be operated by the search component 130. One sub-process that can be performed is a determination of an object in the image. In step 232, the image analysis component 136 of the search component 130 performs analysis to identify objects in the image. In step 234, a criteria 132 is determined from the determination of the objects in the image. For example, the image may be analyzed to determine that there is "rug" or a "patterned rug". Different levels of specificity are contemplated. For example, object determination may identify the rug as "Oriental" or "Asian" or predominantly of one color.

Another sub-process that can be performed on the image input is the determination of the signature value. In one embodiment, the signature value is determined by detecting or determining the object(s) in the image in step 236. From image data corresponding to the object, the object's signature value is determined in step 238. Then in step 240, a criteria may be formed based on the signature value in step 240.

The sub-processes may for image data input may be combined to yield a criteria that identifies the object and its signature. For example, an image of a carpet may yield object determination ("predominantly red rug") and a signature value (identifying the pattern of the rug).

Alternatively, a text based search criteria 132 may be received from the content. For example, text data may be correspond to key words in a document the person is viewing, or which corresponds to metadata that accompanies an image. The text data may form the basis of a criteria 132.

One criteria 132 may include a combination of all the processes described. For example, a user may view a web page for a carpet for sale. The text for the sale item may be analyzed and parsed to identify the word "carpet". From the image, image recognition may yield a "red rug" and the signature value corresponds to a pattern of the rug. The criteria 132 may be formed from all three processes, so that it includes specification of carpet, red rug, and a signature value for the pattern.

Once the criteria 132 is established from the input, step 260 provides that one or more images are selected for display to the user. The criteria 132 may correspond to an output of the image analysis component 136 and/or the text component 138.

The index may be scanned to return matching entries in step 270. The entries may identify the images by location, or alternatively supply the images directly. The images may be formed in a new web page, or form a portion of an existing web page. Various implementations are contemplated by which resulting images of the search are returned to the user.

Advertisement Selection

The following illustrate various usage scenarios that correspond to one or more embodiments of the invention. Any of the methods described in the usage scenarios may be implemented using a system such as described with FIG. 1.

Figure 3:
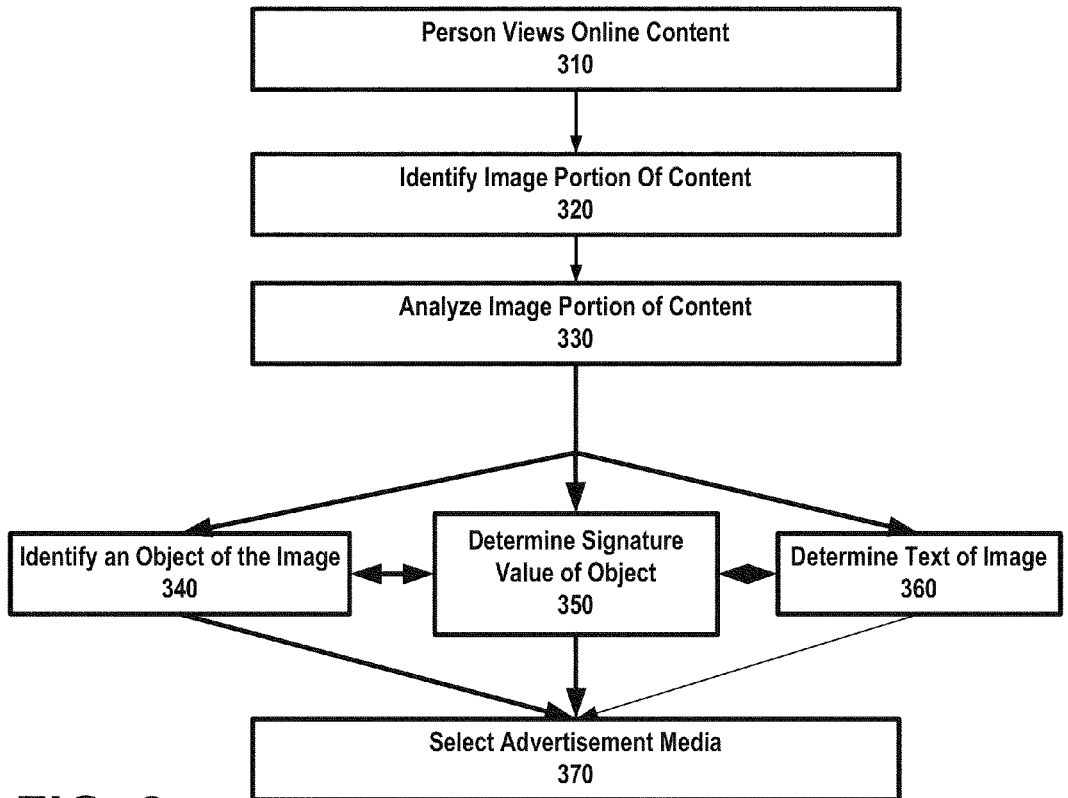
FIG. 3 illustrates a method for supplying a person with pertinent advertisement, under an embodiment of the invention.

FIG. 3 illustrates a method for supplying a person with pertinent advertisement, under an embodiment of the invention. In step 310, a person is detected as viewing an online content comprising an image. Step 320 identifies the image portion of the content. Step 330 provides that the image content is analyzed using the image analysis component 136. In one embodiment, a step 340 identifies an object of the image. As an alternative or additional step, step 350 determines a signature of the identified object. As another alternative or additional step, step 360 identifies text associated with the image. Each of the determinations about the image are used to formulate a query to the index 120, which in the embodiment described, contains advertisement media. In step 370, an advertisement media is selected for the user based at least in part on the image of the content he was viewing.

Merchandise Objects

As mentioned, embodiments described herein may apply to performing object determination, recognition, and similarity comparison on objects such as merchandise. Merchandise objects provide another example of an implementation for a system such as described with FIG. 1.

In determining merchandise from a random image or content, one embodiment provides that text and metadata information associated with the image is used as clues to identify the object of the image. In one embodiment, pre-defined categories are identified, and based on information such as keywords describing the image, URL locating the image, or other information, a categorization of the object in the image is made. For instance, a website might have named the shoes as "men's footwear". A corresponding pre-defined category may be labeled "men's shoes". In one embodiment, a rule-based system can be used to map descriptive terms of an image to a predefined category. For instance, if the term "shoe", and "for him" is identified in the descriptive text of the image, that item can be assumed to be in men's shoes categories. The rule based system may include a set of rules to perform such assignments.

In another embodiment, the mappings can be done by a learning algorithm. For such an embodiment, a large collection of data is collected. A learning algorithm may be trained that can learn automatically the dependency of the words to categories. Optionally, the results of an automating category mapping algorithm can be verified and updated by human operators for accuracy.

Figure 4A:
FIG. 4A and FIG. 4B illustrate a result of segmentation on a merchandise object, as performed by one or more embodiments described herein.
Figure 4B:

In an embodiment, segmentation is performed on the image. While categorization may assist segmentation, segmentation on the image data itself may be performed independently. The objective of the segmentation process is to separate the object(s) of interest from the background. For this, any foreground/background segmentation algorithm can be used. In one embodiment, the background can be assumed to be at the sides of the images, whereas the foreground can be assumed to be at the center. The intensity distribution of both foreground and background can be obtained from the center and side pixels respectively. As an example, a mixture of Gaussian models can be learnt for the foreground and background pixels. As a last step, these models can be applied to the whole image and each pixel can be classified as foreground and background. Optionally, the segmentation outputs of the algorithm can be verified by human operators for accuracy. FIG. 4A and FIG. 4B illustrate a result of segmentation on a merchandise object, as performed by one or more embodiments described herein.

Following segmentation, a process of extraction may be performed. Once the object is segmented from the background, features that obtain the color, shape, boundary, and pattern of the foreground object are calculated. Such features may be referred to as "visual features". Each of these features may be stored numerically as vectors and each item may be indexed. For such entries, the index 120 may include in part or whole a similarity database where the item's metadata is saved along with the visual features. In combination, one by one, or collectively, the various feature vectors for an object may comprise the signature value. The item's metadata is also saved as a metadata feature vector. In one embodiment, the metadata feature can be a mapping of the words to unique identifiers that are derived from a dictionary look-up. Inverse document frequency (IDF) of the word can be saved along with this unique identifier. The IDF indicates how frequent the word happens in documents, and hence how descriptive it is. For instance, if we are looking at shoe items, the word "shoe" is not very descriptive since it happens nearly in all the documents (items).

The visual and metadata features can be indexed using various indexing algorithms. In one embodiment, a linear index can be used where each item is stored linearly in a file. In another embodiment, a tree based indexing algorithm can be used, where the nodes of the tree would keep clusters of similar looking items. This way, only that node needs to be loaded in the search time, and the search may be performed faster.

In one embodiment, once all the items go through the steps of 1) Category mapping, 2) Segmentation 3) feature (signature) extraction and 4) indexing, the index database is saved, it is ready to be searched. The search can be initiated from another image. For instance, the user would tell find more examples (shoes) like another one that they liked. This would make a query to the search index, and a weighted distance matching is applied between the visual and metadata features of the query image and all the images in the index database. In one embodiment, this weighting can be a linear combination. In another embodiment, this weighting can be done based on non-linear transformations.

Optionally, once the user gets the results he or she can provide additional feedback to get more accurate results. Different embodiments can be based on slider, color picker or based on choosing different key regions in the image. In the case of sliders, the user is allowed to change the weights of shape, color or pattern or style of the returned items. In the case of color picker, the user can choose a particular that he or she is interested in, and then the algorithm would match the query image's shape in that particular color. In the case of key regions, the user draws a rectangle on where he is interested in, and the system would run a query on local features of that kind. For instance, the user can draw a rectangle on the high heel, and the algorithm looks for high heels on all the images. The results are refined on run-time, as the users play with any of these feedback mechanisms.

In one or more embodiments, when index 120 is used to store information about images of merchandise objects, the information may include URLs or other links to online merchants that provide the merchandise objects for sale. The URL or link may be returned with images when searches are performed by, for example, search component 130. Thus, when, for example, a similarity search is performed, results of the similarity search include images that are active, and enable selection by the user to access a site of an online merchant where the merchandise object is provided.

Figure 5:
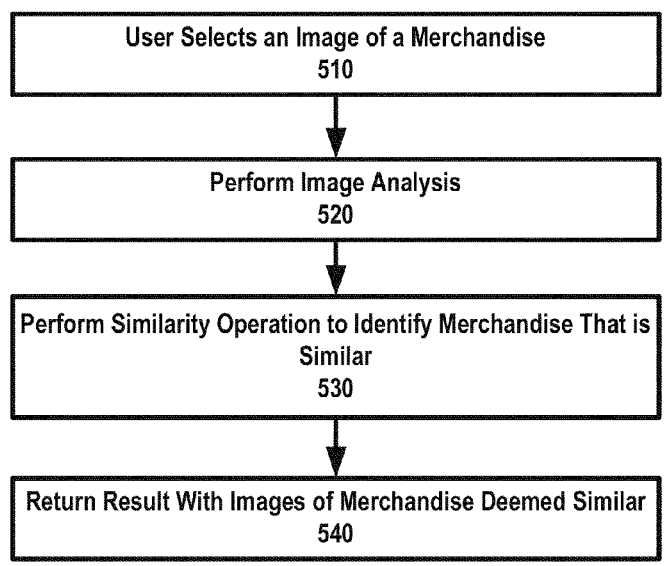
FIG. 5 illustrates a method for supplying a person with the ability to view merchandise and locate the same or similar merchandise through an on-the-fly image comparison, under an embodiment of the invention.

FIG. 5 illustrates a method for supplying a person with the ability to view merchandise and locate the same or similar merchandise through an on-the-fly image comparison, under an embodiment of the invention. In a step 510, a user selects an image of a merchandise object, such as a shoe or a rug. Step 520 provides that image analysis is performed on the image of the selected merchandise. From the image analysis, a signature value is determined.

In step 530, a similarity operation may be performed by the search component 130 on the index 120. The similarity operation may specify the merchandise object and the signature value, or alternatively the various feature vectors and other identifying information stored in the index 120. In addition, the similarity operation may identify objects that are in images recorded in the index, with signature values that are deemed to be similar to the selected object. In one embodiment, two objects are deemed similar if the signature values are within a designated threshold.

Another technique for performing such a similarity performance is taught in U.S. patent application Ser. No. 11/246,742, entitled SYSTEM AND METHOD FOR ENABLING THE USE OF CAPTURED IMAGES THROUGH RECOGNITION, filed on Oct. 7, 2005; which is incorporated by reference herein. Thus, the similarity comparison may return as a result all images containing an object with a feature vectors and/or signature values that are within a designated threshold that defines the similarity. The threshold may be one of design preference or dictated by the particular application.

In step 540, a result comprising one or more images with objects deemed to be similar in appearance is returned to the user. In one embodiment, the result includes, at least initially, only a single image that contains an image deemed most similar to the selected object. In another embodiment, a series, sequence or other plurality of images may be displayed. The images may be sorted or ranked by various factors, including proximity of similarity or other factors.

In an implementation of an embodiment such as described with FIG. 5, a user may view an auction or e-commerce page that shows an object for sale. The user may select a feature, or alternatively access a site, that accepts the image as input and processes the image to determine a signature value. One or more implementations also provide that text associated with the merchandise (e.g. auction heading) may also be used to specify a category that the signature value is to apply to. Then a search of the index 120 is performed to identify either exact matches (e.g. the same item on sale at another auction or site) or an item that is deemed similar to the selected merchandise. For example, the user may like the item being viewed, but may want to see what else that is similar in appearance is offered at a particular auction site or on other e-commerce sites.

Additional Applications

In one embodiment, an algorithm is used to automatically generate images related to text content, such as articles. As described in provisional patent application No. 60/679,591, tags can be extracted from images, using information obtained from recognition, corresponding to objects in them, and text in them. Those tags and images are collected in a central server. All images are indexed using the tags inside them. In addition, an inverse index is created such that, given a tag, the inverse index provides all the images that contain that tag. In addition, a picture ranking algorithm, as described in provisional patent application No. 60/679,591 determines the most relevant images with that tag.

In one embodiment, the tagging system can be used for an application called "photosense". There are many articles provided with online source that can be supplemented with images. The article might be more valuable and more readable by the addition of relevant photos. As a first step, the system traverses the article, and find the key words. The key words can be found by looking at the frequency of words, and looking at the title. These words might be filtered by a proper noun dictionary if necessary. Once the most relevant words to the article are found, then the central server is connected and a search is applied on the relevant words. The most relevant search image results are returned, and they are automatically posted next to the images. In addition, an overlay on the images can be shown when the mouse is on the images. When the user presses on the overlay, the page might be directed to the web page of the actual product item, or full search page of the item from the central server. This way, photos are included to add value to the article, as well as, ads are displayed in images, and in a non-disturbing manner to the user. This system generates revenues based on advertisements.

In any one person's library, there are photos of many people. There are photos of their direct family, photos of their extended family, photos of friends, photos of colleagues, and photos of other people who attended the same event (wedding, soccer game, etc). Sharing photos today is labor intensive for the sender and requires tremendous patience and persistence by the receiver (reminding the other party to please send a copy of that photo). Having a large library of photos that is auto-tagged with who and what is in the photo by itself doesn't solve the problem. One cannot simply add these photos to a search engine and show anyone searching all of the photos that match his search, because it would violate the privacy of the owner (of the photos). In order to solve the sharing problem without violating the privacy rights, embodiments contemplate use of a photo sharing system called "gradual photo discovery".

As described in Provisional Patent Application No. 60/679, 591, first a user adds his photos to the system. The system auto-tags the photo with who, what, and where the photo is. At this point the photo is marked private so no one can see it. A very blurred version of the photo is created for both the thumbnail view and the screen resolution view. However the tags (meta-data) about the photo is added to the global search index. Let us assume that this photo has the tags: "Burak", "Ozge", "Munjal", and Las Vegas and is a photo that Burak added. Now when Munjal searches on the photo (assuming he is not aware that Burak is using the system and/or is not linked to Burak as a friend in the system) with the keywords Munjal and Las Vegas, the system returns a communication identifying one or more pictures that match the criteria. However, the returned image would not be shown to the user in its entirety, but in some degraded, or retracted fashion. For example, the results may be shown in a very blurred fashion. Munjalcan then select a feature to procure access to the image. For example, an icon or other feature may be presented to "Get" access on the blurred photo. This enables him to write the submitter (Burak) a message requesting access to the full image. The submitter may then elect to reply, grant access or deny access. If he says yes, Munjal can now see the full unblurred photo. The submitter may also have the option of marking the photo "public" so that anyone can see it from that point forward. In the event that Munjal, has multiple search result hits that match his search but are blurred (private) he can request them all at once using a so-called "Get all" button and can write one note to all of the owners.

Traditional photo sharing was always "push" based because of privacy reasons. The addition of meta-data allows to create this new "gradual photo discovery" system whereby one can first find a photo (using it's meta-data) and later see the photo (once you get permission using the Get request). Traditionally one could only find a photo once you have seen the photo not allowing this gradual trust based process to take place. An index or database such as shown with various embodiments can facilitate an embodiment for such gradual image sharing and privacy concern.

As another example of an embodiment, one or more embodiments contemplate use of image content items in connection with a matchmaking or dating site. In one embodiment, a person can specify a celebrity, either by image or by name. The system 100 may determine the signature values of images in a collection corresponding to persons making themselves available on the date site. When the person specifies the celebrity, embodiments identify a signature value of the celebrity or a dress (or shoe) she is wearing. The signature value can be used as part of or the basis of the search term. The search component 130 can then perform a search of the index 120 for similar images and return people or merchandise of a particular type in appearance. As another example, a user can provide images of a person (ex-girlfriend, ex-boyfriend, etc), and the system can return pictures of other similar looking people. Still further, a person may view any random picture from, for example, a news item, and then select the image for a similarity search of other similar looking people.

Conclusion

As mentioned, it is contemplated for embodiments of the invention to extend to individual elements and concepts described herein, independently of other concepts, ideas or system, as well as for embodiments to include combinations of elements recited anywhere in this application. Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. This, the absence of describing combinations should not preclude the inventor from claiming rights to such combinations.

What is claimed is:

1. A computer-implemented method for providing images to be viewed, the method comprising:

associating, with a first image in a collection of images, data that identifies one or more persons who have permission to view the first image in a complete form;

determining that a first person requesting to view the first image is not one of the one or more persons who have permission to view the first image in the complete form; and providing the first image to the first person in an altered form, in which one or more persons are depicted to be less recognizable as compared to how the one or more persons would be depicted if the first image was to be displayed in the complete form;

enabling the first person to submit a request to be included as one of the one or more persons who have permission to view the first image in the complete form;

providing the request to a submitter of the first image; and enabling the submitter of the first image to designate that the first person is to be included as one of the one or more persons who have permission to view the first image in the complete form.

2. The method of claim 1, further comprising:

determining that a second person requesting to view the first image is one of the one or more persons who have permission to view the first image in the complete form; and providing the first image for the second person in the complete form.

3. The method of claim 1, further comprising providing a user-interface feature with the first image to enable any person to submit the request.

4. The method of claim 1, wherein providing the first image for the first person in the altered form includes blurring at least a face of a person depicted in the first image so that an identity of the person depicted in the first image is not determinable.

5. The method of claim 1, wherein providing the first image for the first person in the altered form includes redacting at least a portion of the first image depicting a person so that an identity of the person depicted in the first image is not determinable.

6. The method of claim 1, wherein providing the first image for the first person in the altered form includes degrading at least a portion of the first image depicting a person so that an identity of the person depicted in the first image is not determinable.

7. The method of claim 1, further comprising performing recognition on the first image to detect a person depicted in the first image, and wherein providing the first image includes blurring at least a portion of the first image corresponding to the person so that an identity of the person depicted in the first image is not determinable.

8. The method of claim 1, wherein the data that identifies one or more persons who have permission to view the first image in the complete form includes metadata that is provided with the first image.

9. The method of claim 1, further comprising performing recognition to detect the one or more persons that are depicted in the first image.

10. The method of claim 1, wherein providing the first image to the first person in the altered form includes maintaining a copy of the first image in the altered form, separate from a copy of the first image in the complete form, and providing the first person the copy of the first image in the altered form.

11. A computer-readable medium for providing images to be viewed, the computer-readable medium storing instructions, that when executed by one or more processors, cause the one or more processors to perform operations comprising:

associating, with a first image in a collection of images, data that identifies one or more persons who have permission to view the first image in a complete form;

determining that a first person requesting to view the first image is not one of the one or more persons who have permission to view the first image in the complete form;

providing the first image to the first person in an altered form, in which one or more persons are depicted to be less recognizable as compared to how the one or more persons would be depicted if the first image was to be displayed in the complete form;

enabling the first person to submit a request to be included as one of the one or more persons who have permission to view the first image in the complete form;

providing the request to a submitter of the first image; and enabling the submitter of the first image to designate that the first person is to be included as one of the one or more persons who have permission to view the first image in the complete form.

12. The computer-readable medium of claim 11, further comprising instructions for:

determining that a second person requesting to view the first image is one of the one or more persons who have permission to view the first image in the complete form; and providing the first image for the second person in the complete form.

13. The computer-readable medium of claim 11, further comprising instructions for providing a user-interface feature with the first image to enable any person to submit the request.

14. The computer-readable medium of claim 11, wherein the instructions for providing the first image for the first person in the altered form includes instructions for blurring at least a face of a person depicted in the first image so that an identity of the person depicted in the first image is not determinable.

15. The computer-readable medium of claim 11, wherein the instructions for providing the first image for the first person in the altered form includes instructions for redacting at least a portion of the first image depicting a person so that an identity of the person depicted in the first image is not determinable.

16. The computer-readable medium of claim 11, wherein the instructions for providing the first image for the first person in the altered form includes instructions for degrading at least a portion of the first image depicting a person so that an identity of the person depicted in the first image is not determinable.

17. The computer-readable medium of claim 11, further comprising instructions for performing recognition on the first image to detect a person depicted in the first image, and wherein instructions for providing the first image includes instructions for blurring at least a portion of the first image corresponding to the person so that an identity of the person depicted in the first image is not determinable.

18. The computer-readable medium of claim 11, wherein the data that identifies one or more persons who have permission to view the first image in the complete form includes metadata that is provided with the first image.

19. The computer-readable medium of claim 11, further comprising instructions for performing recognition to detect the one or more persons that are depicted in the first image.

20. The computer-readable medium of claim 11, wherein the instructions for providing the first image to the first person in the altered form includes instructions for maintaining a copy of the first image in the altered form, separate from a copy of the first image in the complete form, and instructions for providing the first person the copy of the first image in the altered form.

21. A computer system comprising: a memory that stores a set of instructions;

one or more processors that use instructions stored in the memory to:

associate, with a first image in a collection of images, data that identifies one or more persons who have permission to view the first image in a complete form;

determine that a first person requesting to view the first image is not one of the one or more persons who have permission to view the first image in the complete form; and provide the first image to the first person in an altered form, in which one or more persons are depicted to be less recognizable as compared to how the one or more persons would be depicted if the first image was to be displayed in the complete form;

enable the first person to submit a request to be included as one of the one or more persons who have permission to view the first image in the complete form:

provide the request to a submitter of the first image; and enable the submitter of the first image to designate that the first person is to be included as one of the one or more persons who have permission to view the first image in the complete form.

\* \* \* \* \*